Patented Nov. 19, 1940

2,222,028

UNITED STATES PATENT OFFICE 2,222,028

PROCESS OF MAKING ARTIFICIAL BODIES FROM UREA AND FORMIC ALDEHYDE

Hans Goldschmidt, Berlin-Grunewald, and Oskar Neuss, Berlin-Charlottenburg, Germany; Marie Isolina Goldschmidt administratrix of said Hans Goldschmidt, deceased, assignors, by mesne assignments, to American Cyanamid Company, a corporation of Maine No Drawing. Application March 29, 1923, Serial No. 628,593. In Germany August 17, 1922

4 Claims. (Cl. 18—55)

Our invention relates to improvements in the process of making artificial bodies from urea and formic aldehyde. As is known in the art, when heating urea and formic aldehyde without condensing agents until the liquid is solidified, and allowing the product to cool, bodies are obtained which contain more or less water, and from which the water can be expelled by drying, which may be done at an elevated temperature.

We have obtained highly waterproof products by using as condensing media such substances of acid character, which themselves are adapted to form with formic aldehyde, resinous condensation products, an example of such substances being phenol.

Now, we have found that perfectly waterproof artificial bodies are produced when urea and formaldehyde are heated together in the presence of a free phenol or another acid material, as condensing agent, and the resulting material molded by heat and pressure, preferably after disintegrating the said material. Thereby artificial bodies are obtained which, depending upon the quantitative ratio of urea and formic aldehyde and depending upon the condensing substances employed, are dim or clear as glass, and which are highly waterproof.

In order that the invention be more clearly understood an example embodying the same may be described hereafter.

*Example.*—200 grammes of urea are heated with 800 cubic centimeters of 30% formic aldehyde in the presence of about 4 cubic centimeters of sulphuric acid to the temperatures generally employed in making condensation products of urea and formaldehyde, until the product is solid (gelatinized) when cold. Thereafter, the gelatinized product of the condensation which may have been dried in the air or in drying apparatus, is disintegrated or ground, and pressed in a hot mold at a temperature of about 100° centigrade or more. The result is a perfectly homogeneous waterproof artificial body.

The present application discloses matter claimed in our copending case, Serial No. 591,639 filed September 30, 1922, namely the mode of production of the condensation products.

We claim:

1. The herein described process of making artificial bodies which comprises mixing urea, formaldehyde and an acid condensing agent and then heating the mixture to effect a condensation for such a period of time that when allowed to cool the mass solidifies, drying and grinding the mass and shaping an article containing the ground mass by hot pressing.

2. The herein described process of making artificial bodies which comprises mixing urea, formaldehyde and an acid condensing agent and then heating the mixture to effect a condensation for such a period of time that when allowed to cool the mass solidifies to a gel after standing, drying and grinding the mass and shaping an article containing the ground mass by hot pressing.

3. A process which comprises consolidating the acid reaction products of urea and formaldehyde by subjecting them to heat and pressure.

4. Heat and pressure consolidated urea-formaldehyde acid reaction products.

HANS GOLDSCHMIDT.
OSKAR NEUSS.